(12) United States Patent
Chen

(10) Patent No.: US 6,449,177 B1
(45) Date of Patent: Sep. 10, 2002

(54) POWER SUPPLY HAVING A MIXED MODE REGULATOR

(76) Inventor: Lee-Fei Chen, No.15, Lane 50, Ba Shyh Rd., Tamsui Chen, Taipei Hsien (TW)

( * ) Notice: Subject to any disclaimer, the term of this patent is extended or adjusted under 35 U.S.C. 154(b) by 0 days.

(21) Appl. No.: 09/929,741

(22) Filed: Aug. 14, 2001

(51) Int. Cl.[7] .............................................. H02M 3/335
(52) U.S. Cl. .......................................... 363/95; 363/20
(58) Field of Search ............................... 363/20, 21.01, 363/95, 97, 131

(56) References Cited

U.S. PATENT DOCUMENTS

| | | | | |
|---|---|---|---|---|
| 5,675,485 A | * | 10/1997 | Seong | 363/97 |
| 5,933,340 A | * | 8/1999 | Adamson | 363/97 |
| 5,963,438 A | * | 10/1999 | Chen | 363/21 |
| 6,009,005 A | * | 12/1999 | Kim | 363/95 |
| 6,088,249 A | * | 7/2000 | Adamson | 363/97 |
| 6,249,447 B1 | * | 6/2001 | Boylan et al. | 363/97 |

* cited by examiner

*Primary Examiner*—Adolf Deneke Berhane
(74) *Attorney, Agent, or Firm*—William E. Pelton, Esq.

(57) ABSTRACT

A power supply having a mixed regulator is able to provide the suitable power source according to the changing load by a switching mode voltage circuit and a series pass controlling circuit. The series pass controlling circuit has high sensitivity in detecting the changing the load, thus the power supply offers the suitable power source according to the changing of the load. The switching mode voltage circuit controls the transformer to output voltage by a PWM IC, so that the transistors for driving the transformer need not be powerful transistors which generate excessive heat. Thus a heat sink is not necessary and the power supply can accordingly be of a compact size.

9 Claims, 13 Drawing Sheets

POWER SUPPLY HAVING A MIXED MODE REGULATOR

BACKGROUND OF THE INVENTION

1. Field of the Invention

The present invention relates to a power supply having a mixed mode regulator, and more particularly to a power supply having a mixed mode regulator that is able to provide advantages such as small size and high sensitivity outputting power source.

2. Description of Related Art

With reference to FIG. 6, a conventional power supply with a series pass regulator comprises a transformer (50), a rectifier and filter circuit (51) connected to the output of the transformer (50), and a comparator (52) connected through a transistor Tr1 to an output of the rectifier and filter circuit (51). The rectifier and filter circuit (51) includes a full filter BD1 and a high voltage capacitor C1 connected to an output of the full filter BD1, that rectifies the AC power source to a DC power source.

When the power supply connects a load (not shown) with the AC power source, an input of the comparator (52) connects to a voltage divider R1, R2 connected to the load (not shown). The output voltage of the comparator (52) controls the transistor Tr1 to be in a conduction or non-conducting state, that is, the transistor Tr1 is used to control current of the DC power source to the load. When a loading of the load is increasing, the output of the comparator (52) outputs a positive voltage to the transistor Tr1, and the current of the Tr1 increases. On the other hand, when the output of the comparator (52) outputs a negative voltage to the transistor Tr1, the current from the transistor Tr1 decreases.

As pre the above description, the power supply with the series pass regulator is able to supply the suitable current to the load according to the present load needed. However as the transformer (50) of the regulator is a low frequency type transformer (50) took up large space, the whole size of the power supply is big. Therefore, it is difficult to achieve a small type of a measuring device using the series pass regulator. Furthermore, the transistor Tr1 has to use the powerful transistor Tr1 to eliminate any possible over-voltage in the loop with the load. However, when the powerful transistor Tr1 has been conducting for a while, the DC power source produces undesirable high temperatures, so that the series pass regulator has to form a heat sink to decrease high temperatures from the powerful transistor Tr1.

With reference to FIG. 7, a power supply with a switching mode regulator comprises a rectifier and filter circuit (60), a high frequency transformer (61) connected to an output of the rectifier and filter circuit (60), a decreasing voltage circuit (62) connected an output of the rectifier and filter circuit (60), a comparator (63) connected to an output of the decreasing voltage circuit (62), a photo coupler (64) connected to the output of the comparator (63), and a PWM IC (pulse width modulator) (65) connected to an output of the photo coupler (64) and connected through a transistor Tr2 to a first coil of the high frequency transformer (61). An output of the decreasing voltage circuit (62) is an output of the power supply to connect a load (not shown) needing a DC power source.

An output of the PWM IC (61) is used to control the duty cycle of the transistor Tr2, that is, when a loading of the load is increasing, the duty cycle of the transistor increases to supply more DC power to the load. On the other hand, when the loading of the load decreases, the comparator (63) outputs a high voltage to the PWM IC (65), and then the PWM IC (65) controls the duty cycle of the transistor Tr2 to increase output power. The transistor Tr2 controlled by the PWM IC (65) has two states, conductive state and nonconductive state. When the transistor Tr2 is in the conductive state, the transistor Tr2 is able to decrease the consuming power transmitting through the decreasing voltage circuit (62). The transistor Tr2 is not able to produce the high temperature, and the transistor Tr2 is the high frequency type, so that the switching mode regulator is able to normally applying the power to the load without the heat sink (not shown). That is, the size of the whole regulator is small, and is suitable to be received in the measuring device. However, the transistor Tr2 often unreliably switches to either of the two states, thus the output DC power of the regulator is unstable.

As pre the above description, the power supply uses whether the series pass regulator or the switching mode regulator each regulator has different the drawbacks. However, any precision instrument needs a power supply with a stable output power.

To overcome the shortcomings, the present invention provides a power supply with a mixed regulator to mitigate and obviate the aforementioned problems.

SUMMARY OF THE INVENTION

The objective of the present invention is to provide a power supply having a mixed mode regulator, and furthermore, an output of the power supply uses the series pass controlling circuit to increase sensitivity for detecting the loading of the load. A switching voltage mode voltage circuit eliminates the need for a powerful transistor and a heat sink. Therefore the power supply provides a stable power output and allows a compact size of the power supply to be achieved. Other objects, advantages, and novel features of the invention will become more apparent from the following detailed description when taken in conjunction with the accompanying drawings.

DETAILED DESCRIPTION OF THE PREFERRED EMBODIMENT

Figure 1:
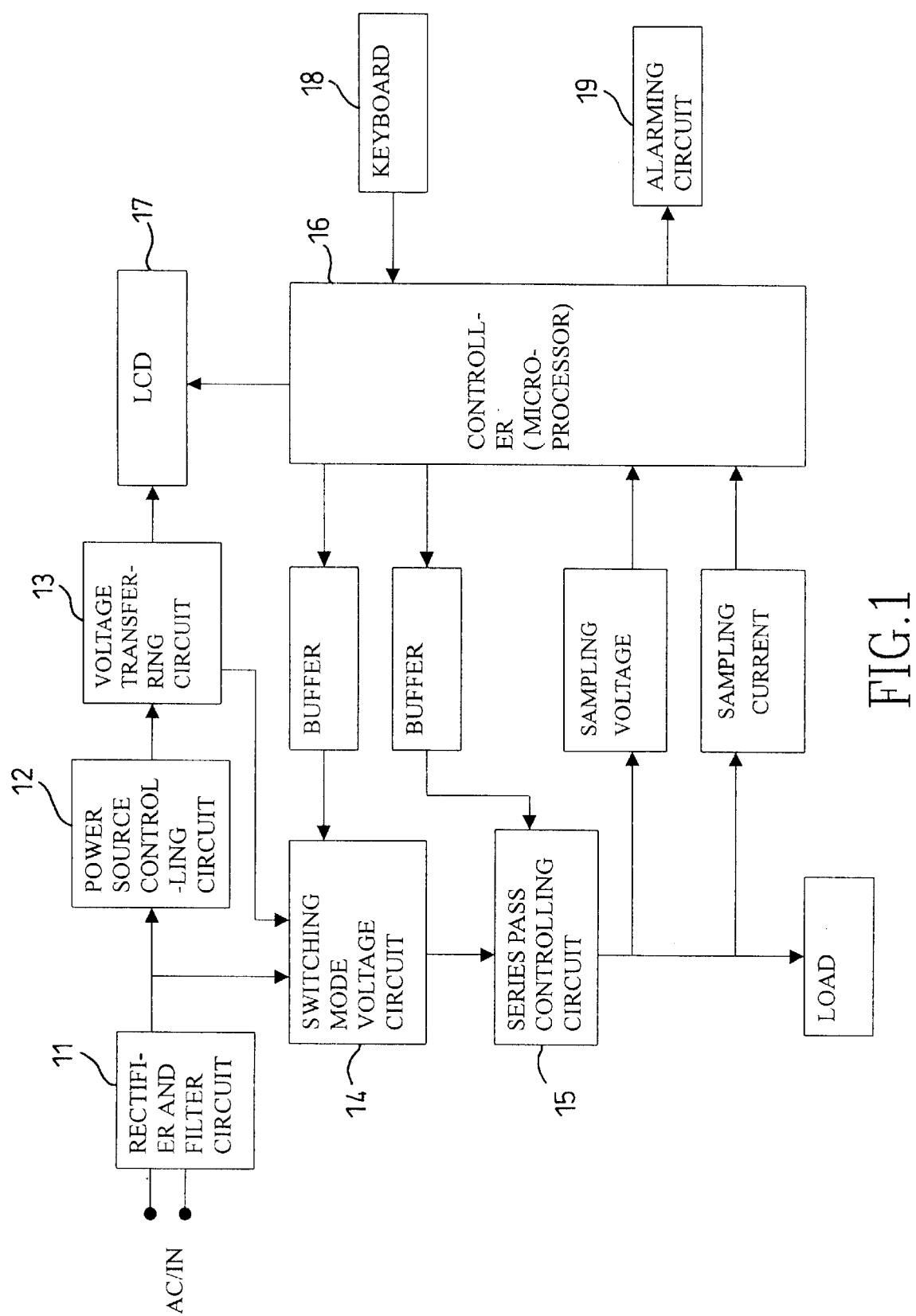
FIG. 1 is a block circuit of a power supply having a mixed regulator in accordance with the present invention.

With reference to FIG. 1, a power supply with a mixed regulator comprises:

a rectifier and filter circuit (11) connected to an AC power source for outputting a DC power source;

a power source controlling circuit (12) connected to an output of the rectifier and a filter circuit (11);

a voltage transferring circuit (13) connected to an output of the power source controlling circuit (12), that is, the power source controlling circuit (12) controls the output of the voltage transferring circuit (13);

a switching mode voltage circuit (14) having multiple inputs and outputs, wherein the inputs respectively connect to an output of the rectifier and filter circuit (11), and wherein the output of the switching mode voltage circuit (14) is an output of the power supply.

a series pass controlling circuit (15) connected to an output of the switching mode voltage circuit (14) to detect a changing of an output;

a controller (16), formed as a microprocessor, connected to the input of the switching mode voltage circuit (14) and the input of the series pass controlling circuit (15), and outputs thereof are connected to the output of the switching mode voltage circuit (14) for obtaining a sampling output voltage and sampling current;

an LCD (liquid crystal display) (17) connected the output of the controller (16) for displaying the present voltage and current; a keyboard (18) connected to the input of the controller (16); and an alarming circuit (19) connected to the output of the controller (16) to alarm that the output power of the power supply is insufficient for the load (not shown).

Figure 2:
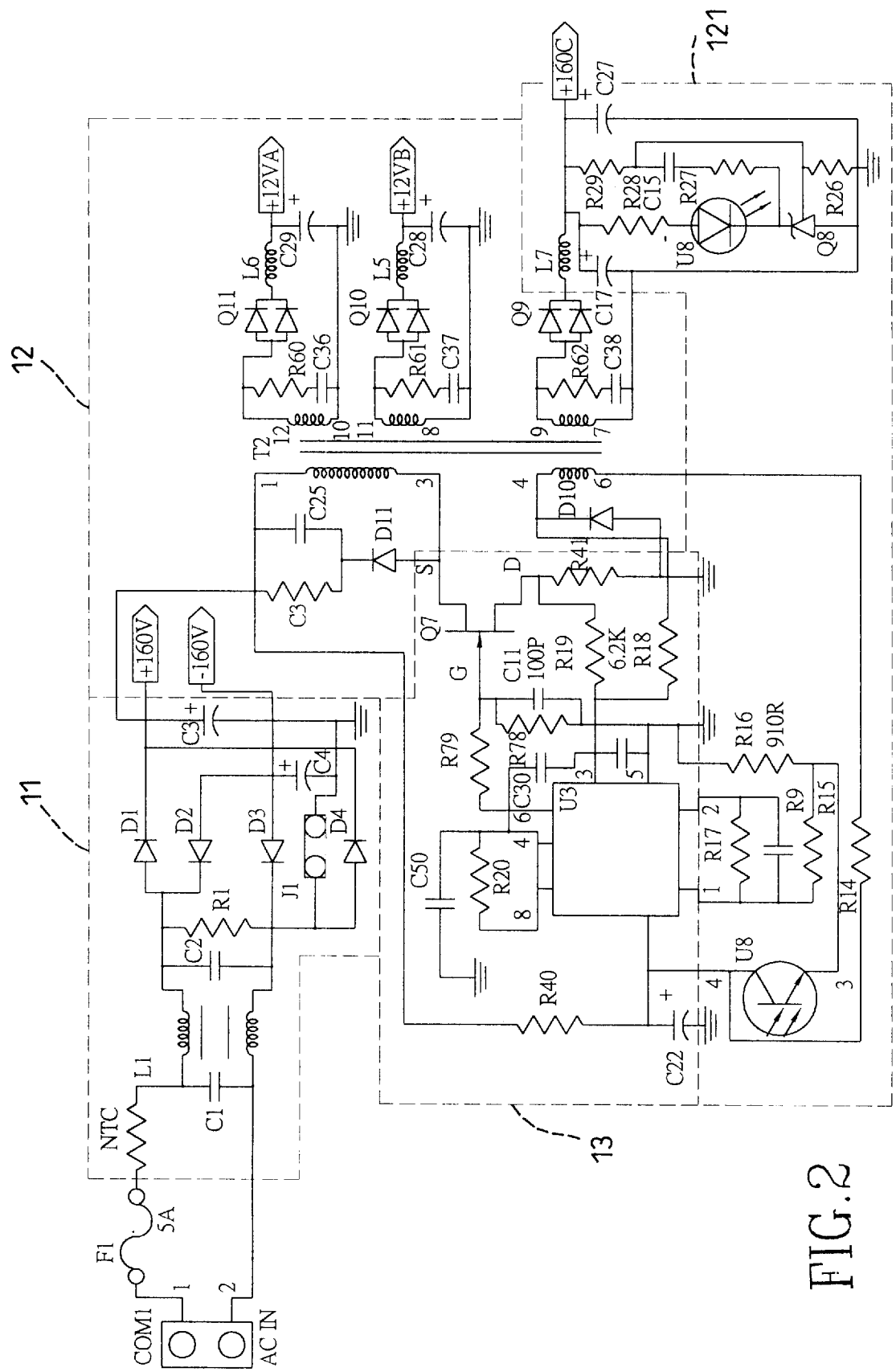
FIG. 2 is a portion of a circuit diagram of the power supply having a mixed regulator in accordance with the present invention.

With reference to FIG. 2, a circuit diagram of the rectifier and filter circuit (11) is shown. The rectifier and filter circuit (11) includes two capacitors C1, C2, a transformer L1, a full filter D1, D2, D3, D4 and a high voltage capacitor C3. When the AC power source is input to the rectifier and filter circuit (11), firstly the full filter D1, D2, D3, D4 outputs a positive half wave, and then inputs the positive half wave to the high voltage capacitor C3 to output a DC power source with a high voltage DC.

The power source controlling circuit (12) includes a PWM IC U3 connected through a transistor Q7 to the first coil of the high frequency transformer T2 to control the current of the high frequency of the transformer T2. One of the voltage transferring circuits (13) connects a photo coupler to the PWM IC U3.

The voltage transferring circuit (13) includes a high frequency transformer T2 connected to an output of the rectifier, three RC filters connected to the transformer T2 for transferring the output voltage of the rectifier and filter circuit (11) to three low voltage DC power sources (1 2V) and a feedback circuit (121) connected the RC filter with an input of the PWM IC of the power source controlling circuit (12). The feedback circuit (121) includes a zener diode Q8 connected to the output of the RC filter to provide a fixed voltage and photo coupler U8, which are used for isolating high/low voltage DC power source and inputting a feedback voltage of the output of the RC filter to the input of the PWM IC U3, that is able to stably control the output low voltage power source of the voltage transferring circuit (13).

Figure 3A:
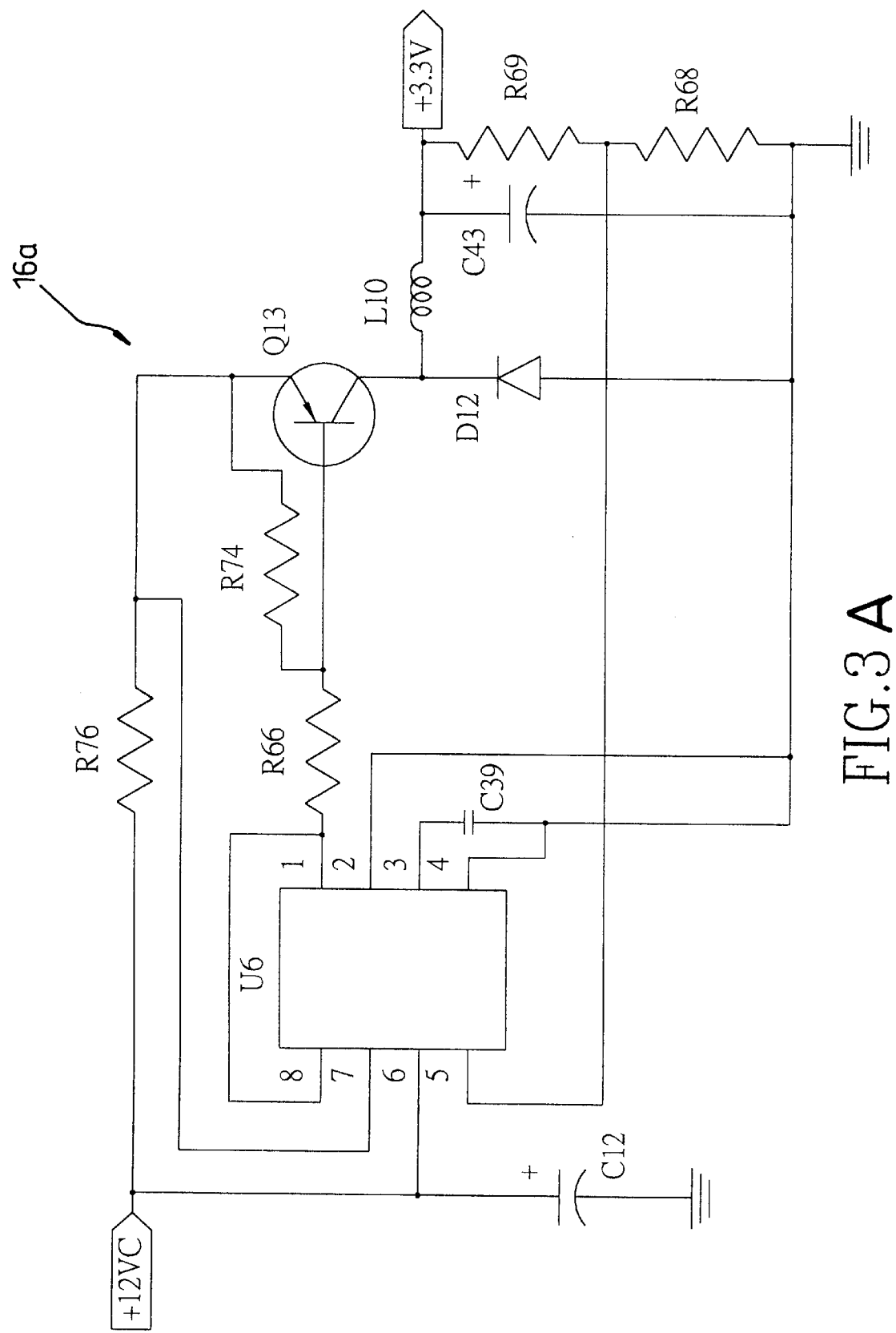
FIGS. 3 A–C are portions of the circuit diagram of the power supply having a mixed regulator in accordance with the present invention.
Figure 3B:
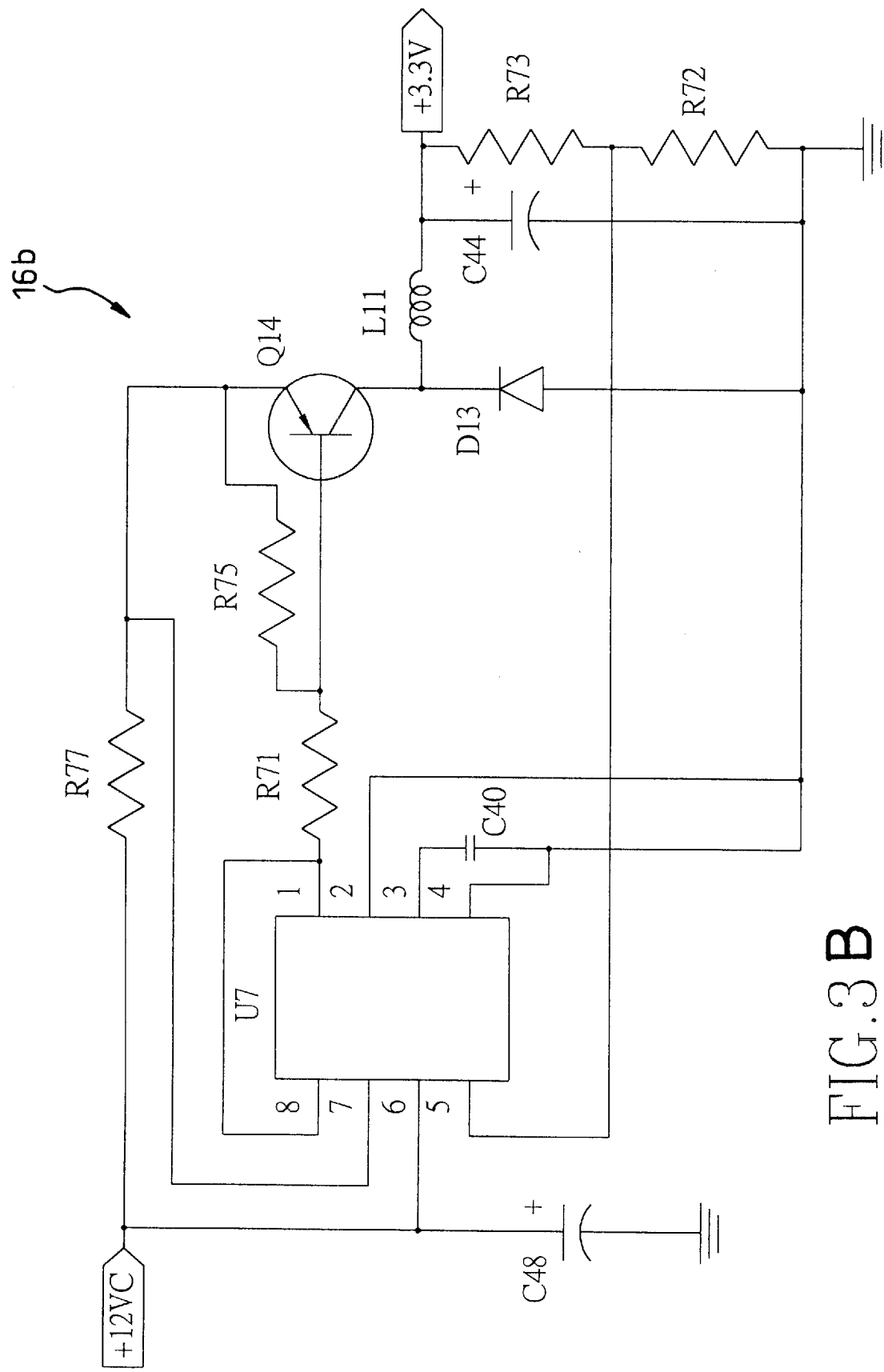
Figure 3C:
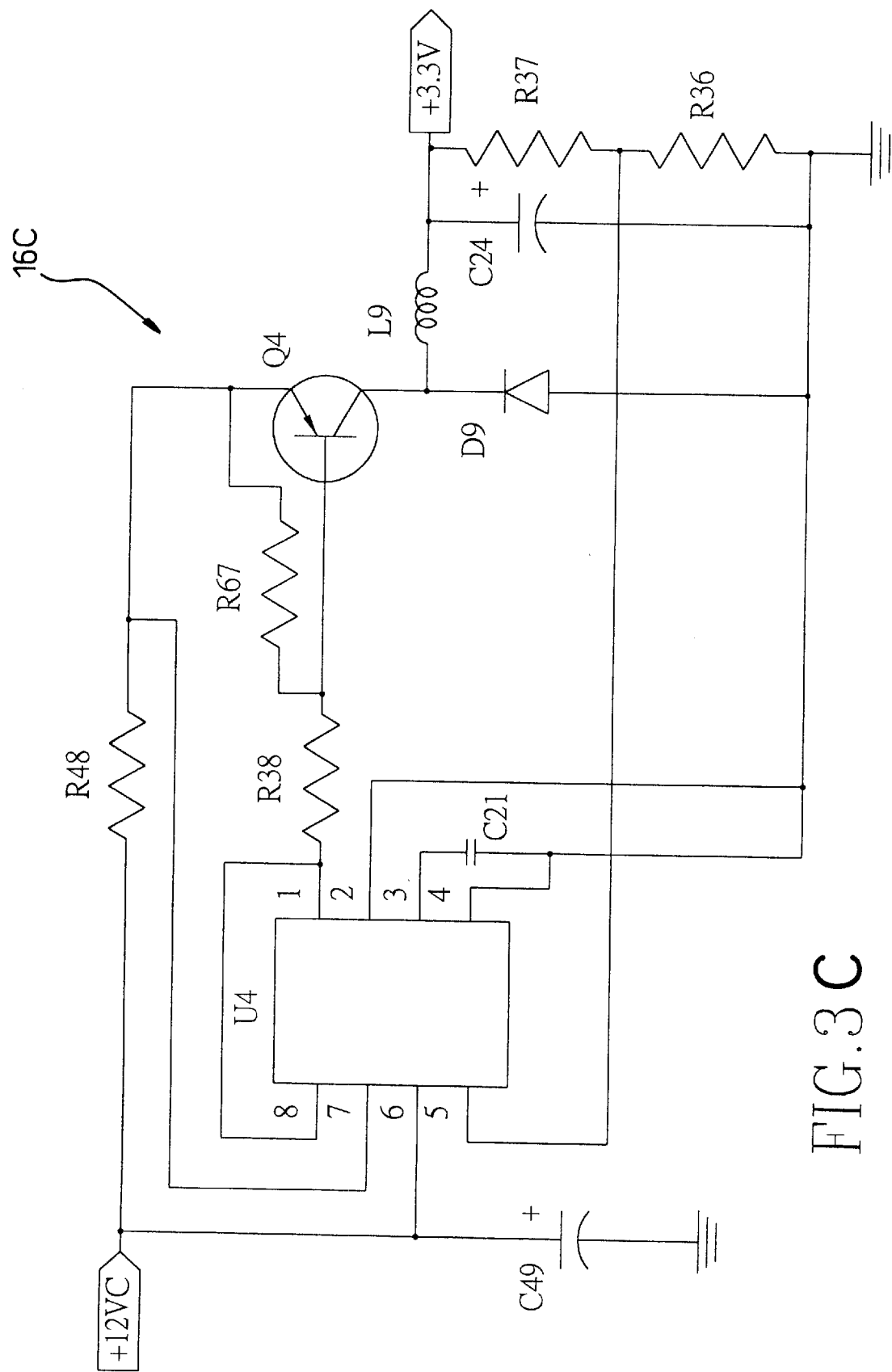
Figure 4A:
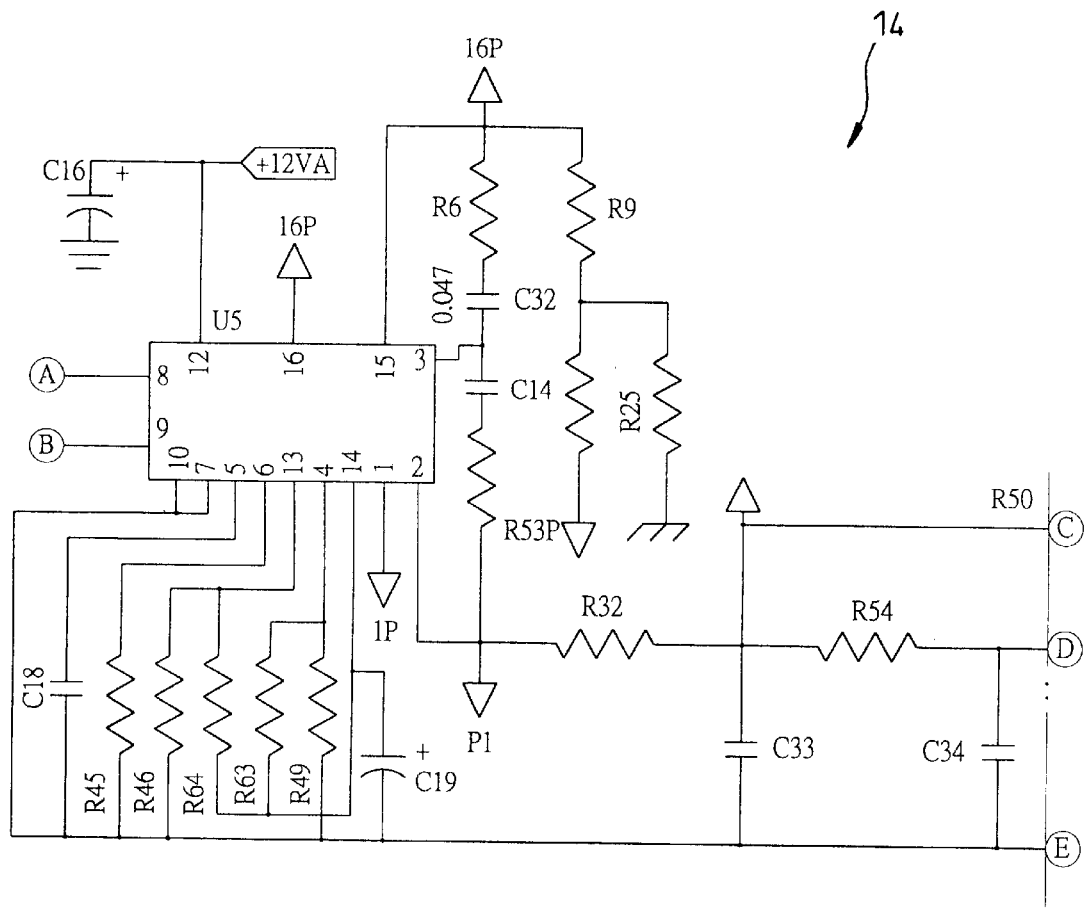
FIGS. 4 A–D are portions of the circuit diagram of the power supply having a mixed regulator in accordance with the present invention.
Figure 4B:
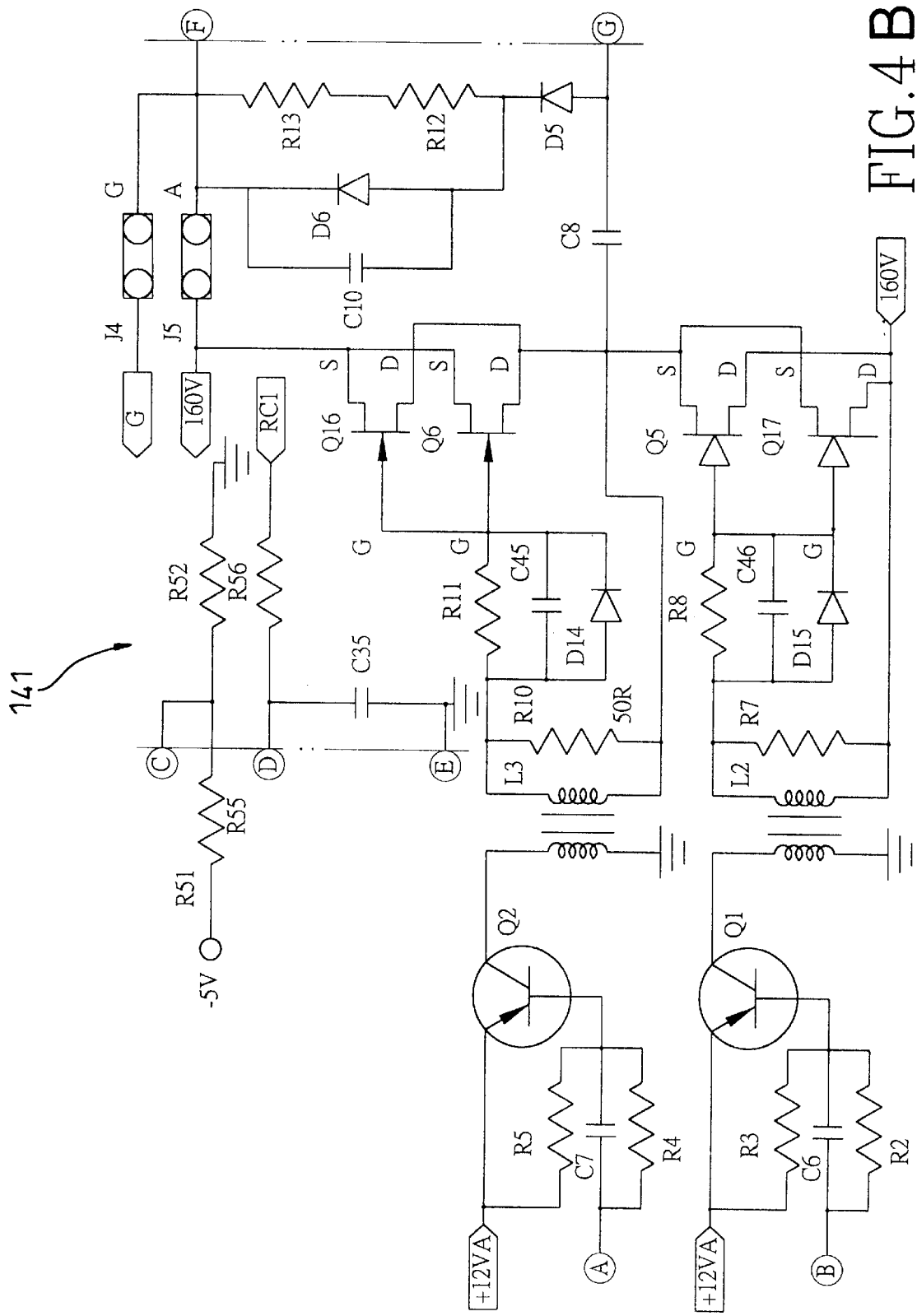
Figure 4:
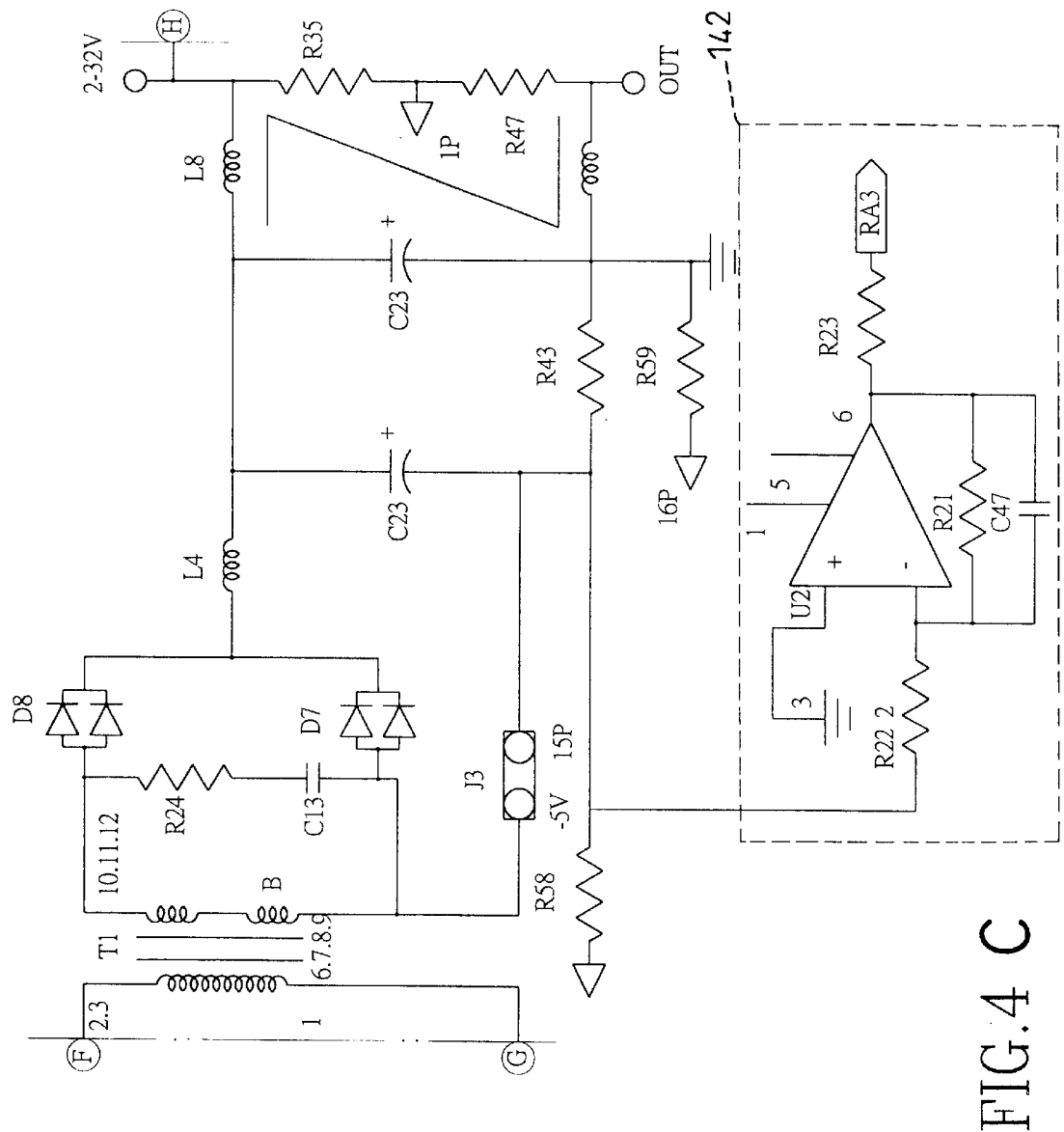
Figure 4:
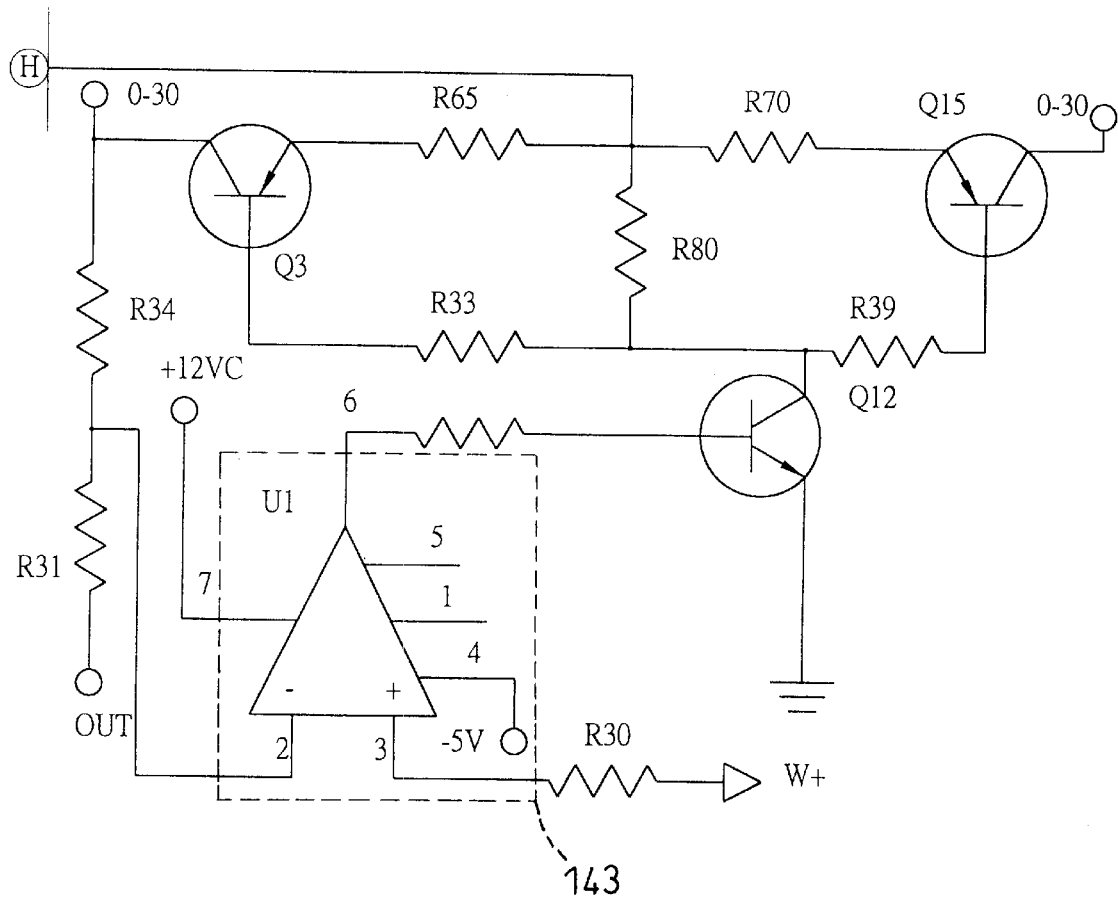

With reference to FIGS. 3A–C, three decreasing voltage circuits (16a), (16b), (16c) respectively transfer further the three output voltages of the voltage transferring circuit (13) to three low DC voltages, such as a 3.3 voltage DC.

With reference to FIGS. 4A–D, four portions of a circuit of the switching mode voltage circuit (14) are shown. The switching mode voltage circuit (14) includes a PWM IC U5, a driving circuit (141) connected an output of the PWM IC U5 and a transformer T1 connected to outputs of the driving circuit (141). An input of the PWM IC US is connected to an output of the controller (not shown), that is, an output signal of the PWM IC U5 is controlled by the controller, as shown FIG. 5A. In reference to FIG. 4B, when the PWM IC U5 outputs a voltage to two transistors Q1, Q2 of the driving circuit (141), the two transistors Q1,Q2 control two FET transistors Q16,Q17 conducting and then switching the transformer T1 (as shown FIG. 4C) to output a low voltage. An output of the Transformer T1 is an output of the power supply.

In reference to FIGS. 4C and 4D, the series pass controlling circuit (14) includes an integrator (142), a comparator (143) and three transistors Q3, Q15, Q12. The integrator (142) connects between the controller (not shown) and the output of the Transformer T1 to get an output sampling current back to the controller. An input of the comparator (143) connects to the output of the Transformer T1 to detect a changing load (not shown) connected to the output of the transformer T1 and then outputted to the transistor Q12. When the low voltage from transformer T1 outputs to the transistors Q3, Q15, the comparator (143) is able to sensitively detect the changing load and then outputs a voltage to control the transistor Q 12 to make the two transistors Q3, Q15 conduct to immediately output the suitable voltage or current to the load.

Figure 5:
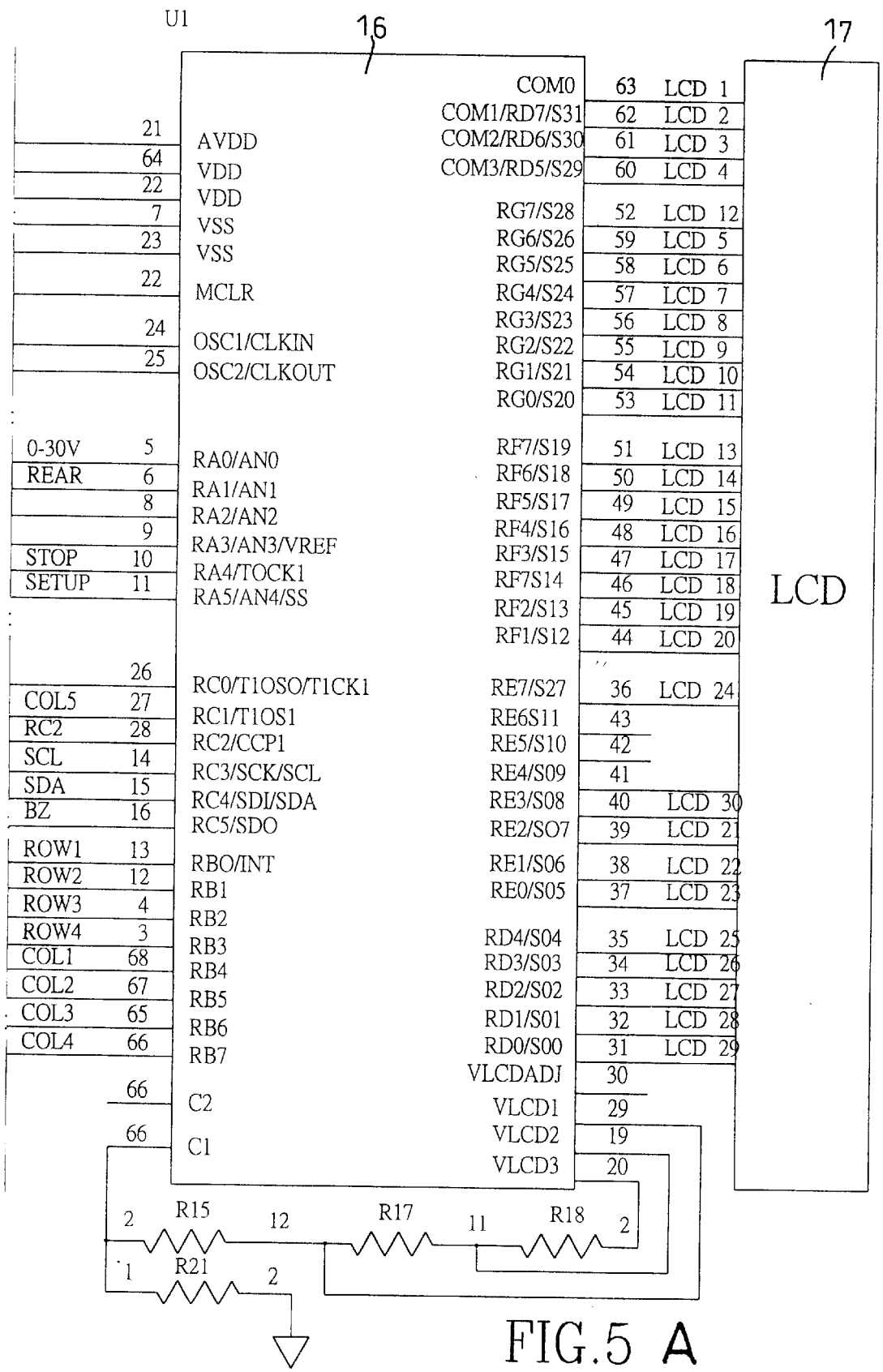
FIGS. 5A,B are portions of the circuit diagram of the power supply having a mixed regulator in accordance with the present invention.
Figure 5B:
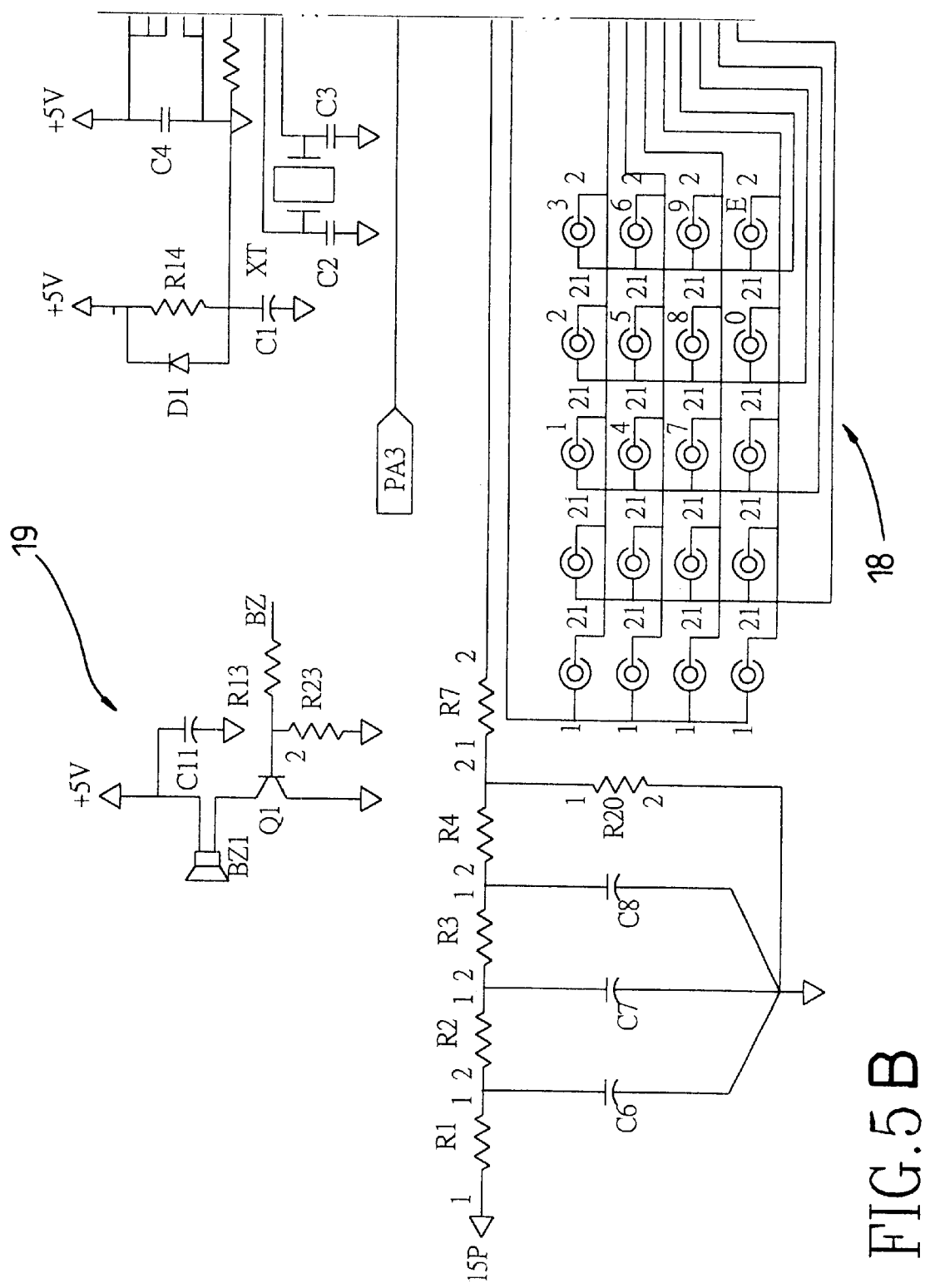
Figure 6:
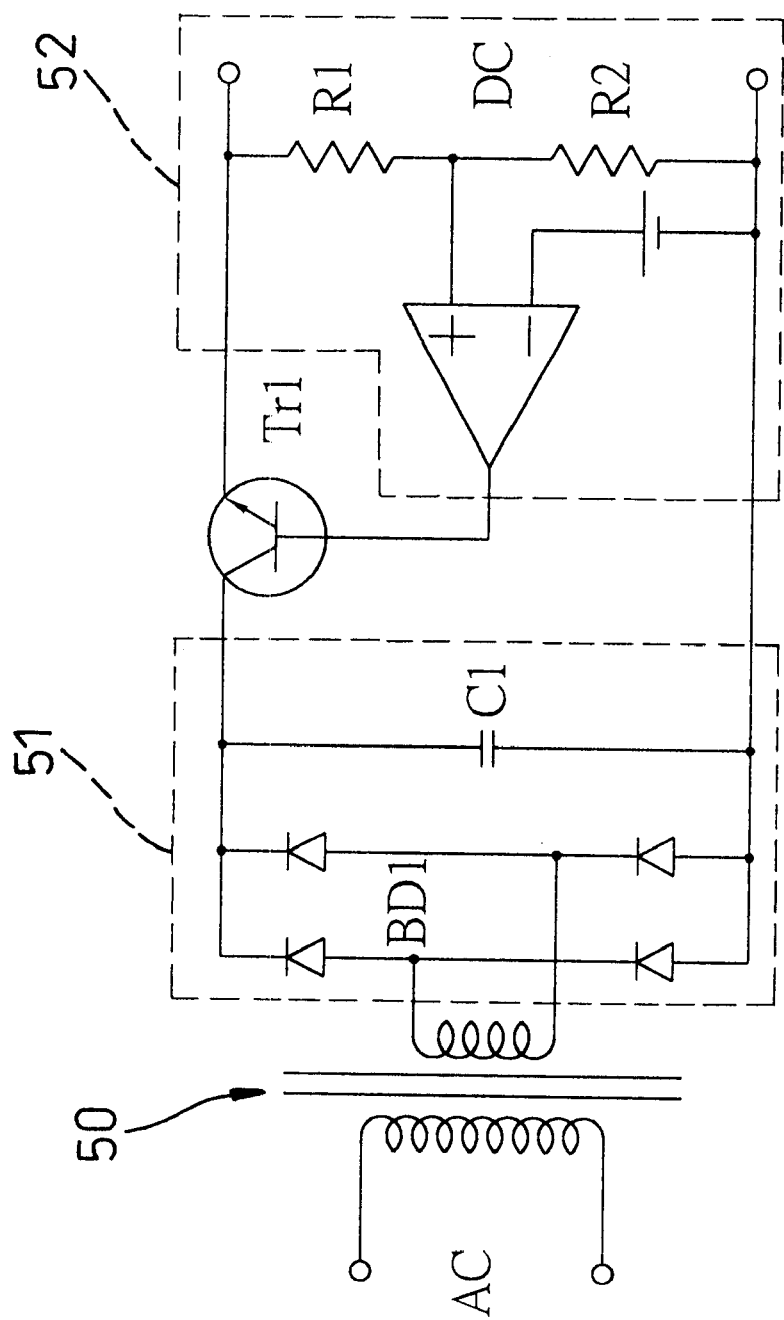
FIG. 6 is a circuit diagram of a conventional power supply having a series pass regulator.
Figure 7:
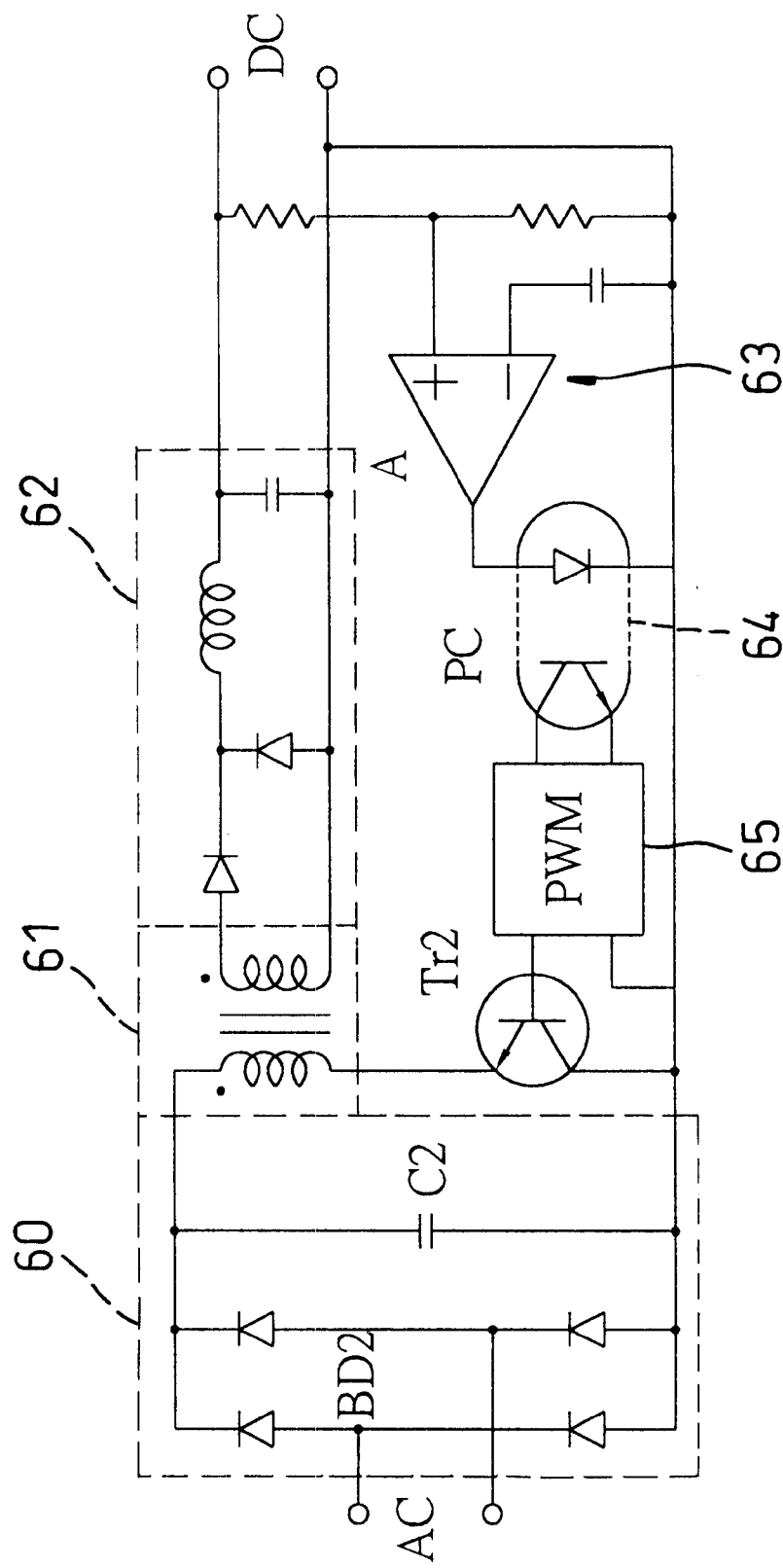
FIG. 7 is a circuit diagram of a conventional power supply having a switching mode regulator.

With reference to FIGS. 5A, 5B, two portions of a circuit of the controller (16), the keyboard (18), the LCD (17) and the alarming circuit (19) are shown. The controller (16) is a processor connected to the alarming circuit (19), the keyboard (18) and the LCD (17). After the controller (16) obtains the output sampling voltage and the output sampling current from the integrator (142) and output of the transformer T1, the controller (15) is able to adjust the frequency of the output voltage to be the same as the input power source that the power factor is close to 1.

As per the above description, the power supply offers the stable power source to a load by the switching mode voltage circuit and the series pass controlling circuit, wherein the series pass controlling circuit has high sensitivity in detecting the changing the load. Therefore the power supply offers the suitable power source according to the changing of the load. The switching mode voltage circuit controls the transformer to output voltage by the PWM IC, so that the transistors for driving the transformer need not be powerful transistors Whereby the power supply offers the power source to the load without need of a heat sink, and the size of the power supply is accordingly small.

Although the present invention has been explained in relation to its preferred embodiment, it is to be understood that many other possible modifications and variations can be made without departing from the spirit and scope of the invention as hereinafter claimed.

What is claimed is:

1. A power supply with a mixed regulator, comprising:

a power source transferring circuit transferring an AC power source to a DC power source;

a switching mode voltage circuit (14) having multiple inputs and outputs, wherein each of the inputs connects to an output of the power source transferring circuit and an output of the switching mode voltage circuit (14) is an output of the power supply to output a low voltage of the DC power;

a series pass controlling circuit (15) connected to an output of the switching mode voltage circuit (14) to detect an output changing and adjust the output DC power according to the output changing; and a controller (16) connected to the input of the switching mode voltage circuit (14) and the input of the series pass controlling circuit (15), wherein outputs of the controller (16) are connected to the output of the switching mode voltage circuit (14) for obtaining a sampling output voltage and sampling current to adjust a frequency of the output DC power source to be the same as the input AC power source.

2. The power supply with a mixed regulator as claimed in claim 1, wherein the switching mode voltage circuit comprises:

a plus width modulation (PWM) IC connected to an output of the controller; and a driving circuit connected to an output of the PWM IC to drive a transformer outputting a low voltage of the power source.

3. The power supply with a mixed regulator as claimed in claim 1, wherein the series pass controlling circuit comprises an integrator connected an output of the transformer of the switching mode voltage circuit with an input of the controller for obtaining from a sampling voltage to the controller.

4. The power supply with a mixed regulator as claimed in claim 1, wherein the power source transferring circuit comprises:

a rectifier and filter circuit connected to the ac power source for outputting a DC power source;

a power source controlling circuit connected to an output of the rectifier and filter circuit; and a voltage transferring circuit connected to an output of the power source controlling circuit for transferring the output voltage of the rectifier and filter circuit to three low voltage DC power sources by a transformer.

5. The power supply with a mixed regulator as claimed in claim 1, wherein the power source controlling circuit comprises a PWM IC and a transistor connected an output of the PWM IC and the transformer of the voltage transferring circuit to control a duty cycle of the transistor, that is for controlling the current of the transformer.

6. The power supply with a mixed regulator as claimed in claim 5, wherein the voltage transferring circuit further comprises:

at least one RC filter connected to an output of the transformer to output a DC power source;

a feedback circuit connected to the at least one RC filter with an input of the PWM IC of the power source controlling circuit to get a present voltage from the at least one RC filter to control the current of the transformer.

7. The power supply with a mixed regulator as claimed in claim 5, wherein a feedback circuit further comprises:

a photo coupler connected to the output of one of RC filter with the input of the PWM IC of the power source controlling circuit; and a zener diode connected to the output of the at least one RC filter to provide a fixed output voltage.

8. The power supply with a mixed regulator as claimed in claim 1, wherein further comprising:

an LCD (liquid crystal display) connected the output of the controller for displaying the present voltage and current;

a keyboard connected to the input of the controller; and an alarming circuit connected to the output of the controller to alarm that the output power of the power supply is insufficient for the load.

9. The power supply with a mixed regulator as claimed in claim 1, wherein the controller is microprocesser.

* * * * *